US010795937B2

(12) United States Patent
Farrell et al.

(10) Patent No.: US 10,795,937 B2
(45) Date of Patent: Oct. 6, 2020

(54) EXPRESSIVE TEMPORAL PREDICTIONS OVER SEMANTICALLY DRIVEN TIME WINDOWS

(71) Applicant: International Business Machines Corporation, Armonk, NY (US)

(72) Inventors: Robert G. Farrell, Cornwall, NY (US); Oktie Hassanzadeh, Port Chester, NY (US); Mohammad Sadoghi Hamedani, Yorktown Heights, NY (US); Meinolf Sellmann, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 15/230,932

(22) Filed: Aug. 8, 2016

(65) Prior Publication Data

US 2018/0039894 A1 Feb. 8, 2018

(51) Int. Cl.
*G06F 16/901* (2019.01)
*G06N 20/00* (2019.01)
*G06N 5/02* (2006.01)

(52) U.S. Cl.
CPC ......... *G06F 16/9024* (2019.01); *G06N 5/022* (2013.01); *G06N 20/00* (2019.01)

(58) Field of Classification Search
CPC .......... G06F 16/9024; G06F 17/30958; G06N 20/00; G06N 5/022; G06N 99/005
See application file for complete search history.

(56) References Cited

U.S. PATENT DOCUMENTS

| 2006/0026203 A1* | 2/2006 | Tan ...................... G06F 17/277 |
| 2009/0012842 A1* | 1/2009 | Srinivasan .......... G06F 16/3344 705/12 |
| 2012/0078835 A1* | 3/2012 | Attaluri .................. G06Q 50/24 706/52 |

(Continued)

OTHER PUBLICATIONS

Mitchell et al., "Never-Ending Learning," Proceedings of the 29th Conference on Artificial Intelligence (AAAI), 2015, pp. 2302-2310, vol. 3.

(Continued)

*Primary Examiner* — Li B. Zhen
*Assistant Examiner* — Henry Nguyen
(74) *Attorney, Agent, or Firm* — Ryan, Mason & Lewis, LLP

(57) ABSTRACT

Methods, systems, and computer program products for expressive temporal predictions over semantically-driven time windows are provided herein. A computer-implemented method includes identifying, within a knowledge graph pertaining to a given prediction, a subset of the knowledge graph related to one or more predicted training examples, wherein the subset comprises (i) a set of nodes and (ii) one or more relationships among the set of nodes; determining, for the identified subset, one or more snapshots of the knowledge graph relevant to the given prediction; quantifying a validity window for the one or more predicted training examples, wherein the validity window comprises a temporal bound for prediction validity; and computing a validity window for the given prediction based on the quantified validity window for the one or more predicted training examples.

15 Claims, 5 Drawing Sheets

(56) References Cited

U.S. PATENT DOCUMENTS

| | | | |
|---|---|---|---|
| 2012/0221589 A1* | 8/2012 | Shahar | G06F 19/00 707/758 |
| 2014/0164298 A1* | 6/2014 | Goranson | G06N 5/02 706/12 |
| 2015/0231786 A1* | 8/2015 | Doi | B25J 9/1605 700/245 |
| 2015/0317376 A1* | 11/2015 | Bauer | G06Q 10/06 707/737 |
| 2017/0228366 A1* | 8/2017 | Bui | G06F 17/279 |
| 2017/0337481 A1* | 11/2017 | Trouillon | G06N 7/005 |
| 2018/0359477 A1* | 12/2018 | Yang | H04N 19/139 |
| 2018/0376177 A1* | 12/2018 | Nugent | H04N 21/23424 |

OTHER PUBLICATIONS

Carlson et al., "Toward an Architecture for Never-Ending Language Learning," Proceedings of the 24th Conference on Artificial Intelligence (AAAI), Jul. 2010, pp. 1306-1313, vol. 5, No. 3.

Kanter et al., "Deep Feature Synthesis: Towards Automating Data Science Endeavors," IEEE International Conference on Data Science and Advanced Analytics (DSAA), Oct. 2015, pp. 1-10.

Poon et al., "Unsupervised Ontology Induction from Text," Proceedings of the 48th Annual Meeting of the Association for Computational Linguistics, Jul. 2010, pp. 296-305.

Franz et al., "TripleRank: Ranking Semantic Web Data by Tensor Decomposition," Proceedings of the 8th International Semantic Web Conference (ISWC), Oct. 2009, pp. 213-228.

Nickel et al., "Holographic Embeddings of Knowledge Graphs," 30th Conference on Artificial Intelligence (AAAI), Dec. 2015, 7 pages.

Nickel et al., "Tensor Factorization for Multi-Relational Learning," Proceedings of the European Conference on Machine Learning and Principles and Practice of Knowledge Discovery in Databases (ECML PKDD), Part III, Sep. 2013, pp. 617-621.

Neelakantan et al., "Knowledge Base Completion Using Compositional Vector Space Models," Neural Information Processing Systems (NIPS) Workshop on Automatic Knowledge Base Construction (AKBC), Dec. 2014, 6 pages.

Roth et al., "Minimally Supervised Event Argument Extraction Using Universal Schema," Neural Information Processing Systems (NIPS) Workshop on Automatic Knowledge Base Construction (AKBC), Dec. 2014, 5 pages.

Sadoghi et al., "Self-Curating Databases," Proceedings of the 19th International Conference on Extending Database Technology (EDBT), Mar. 2016, pp. 467-472.

Taskar et al., "Link Prediction in Relational Data," Advances in Neural Information Processing Systems (NIPS), Dec. 2003, 8 pages.

Liben-Nowell et al., "The Link Prediction Problem for Social Networks," Proceedings of the 12th International Conference on Information and Knowledge Management (CIKM), Nov. 2003, pp. 556-559.

Getoor et al., "Link Mining: A Survey," ACM SIGKDD Explorations Newsletter, Dec. 2005, pp. 3-12, vol. 7, No. 2.

Cukierski et al., "Graph-Based Features for Supervised Link Prediction," Proceedings of International Joint Conference on Neural Networks (IJCMM), Jul.-Aug. 2011, pp. 1237-1244.

Fokoue et al., "Predicting Drug-Drug Interactions Through Similarity-Based Link Prediction Over Web Data," Proceedings of the 25th International Conference Companion on World Wide Web (WWW), Apr. 2016, pp. 175-178.

Rawashdeh et al., "Similarity Measure for Social Networks—A Brief Survey," Proceedings of the 26th Modern AI and Cognitive Science Conference, 2015, 7 pages.

Parikshit Sondhi, "Feature Construction Methods: A Survey," sifaka.cs.uiuc.edu, 2009, 8 pages.

Mell et al., The NIST Definition of Cloud Computing. Sep. 2011.

\* cited by examiner

EXPRESSIVE TEMPORAL PREDICTIONS OVER SEMANTICALLY DRIVEN TIME WINDOWS

FIELD

The present application generally relates to information technology, and, more particularly, to knowledge graph (KG) analysis techniques.

BACKGROUND

A KG captures relationships among entities and types. Additionally, a KG can represent the temporal order or the validity of a relationship with respect to time (and other criteria such as spatial dimension). Further, a KG can capture the evolution of knowledge over time and enable the retrieval of an older snapshot of the knowledge. However, existing approaches for learning predictive models often fail to provide a temporal bound on the validity of a prediction. Further, the models of such approaches often ignore historical predictions given old snapshots of the relevant data.

SUMMARY

In one embodiment of the present invention, techniques for generating expressive temporal predictions over semantically-driven time windows are provided. An exemplary computer-implemented method can include identifying, within a knowledge graph pertaining to a given prediction, a subset of the knowledge graph related to one or more predicted training examples, wherein the subset comprises (i) a set of nodes and (ii) one or more relationships among the set of nodes; determining, for the identified subset, one or more snapshots of the knowledge graph relevant to the given prediction; quantifying a validity window for the one or more predicted training examples, wherein the validity window comprises a temporal bound for prediction validity; and computing a validity window for the given prediction based on the quantified validity window for the one or more predicted training examples.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes techniques for generating expressive temporal predictions over semantically-driven time windows. At least one embodiment of the invention includes determining the temporal validity of a prediction (that is, providing a time bound for prediction validity), for example, by predicating that the value of a particular asset may only be valid for a given temporal duration due to fluctuation in a market. Additionally, one or more embodiments of the invention can include learning from historical predictions given old snapshots of data extracted from a KG by employing the KG (enhanced with historic information) during both training and testing to predict and learn the evolution of data as well as the validity window of the prediction. By way merely of example, a "prediction," such as described herein, can include a prediction of the value of a particular stock (in an algorithmic trading domain, for instance) or a house (in a real estate domain). Additionally, such a prediction may only be valid for a limited duration of time due to fluctuations in the given market.

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
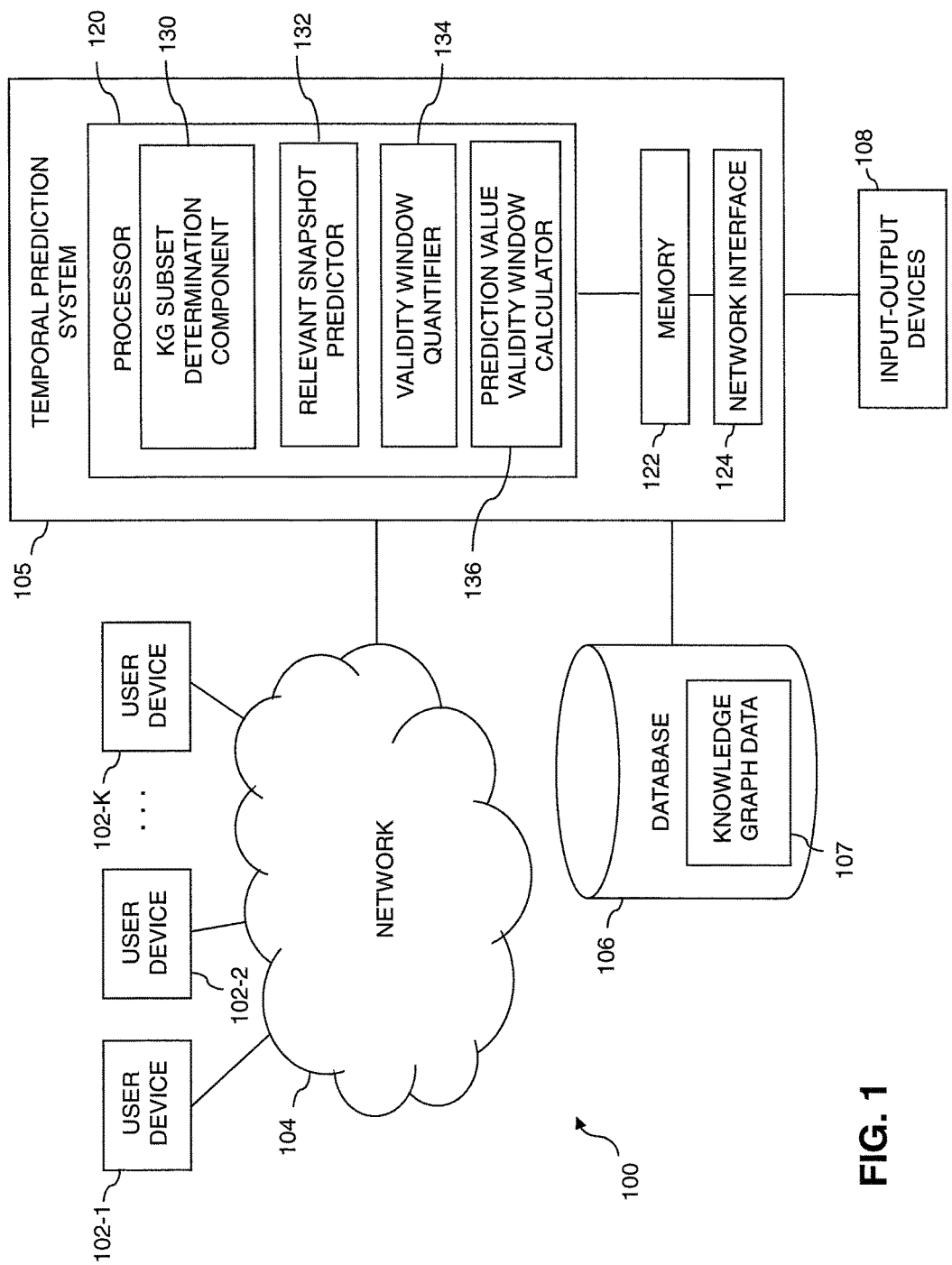
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a temporal prediction system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks each comprising processing devices configured to communicate using internet protocol (IP) or other related communication protocols.

The temporal prediction system 105 has an associated database 106 configured to store KG data 107.

The database 106 in the present embodiment is implemented using one or more storage systems associated with the temporal prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the temporal prediction system 105 are input-output devices 108, which illustratively comprise keyboards, displays or other types of input-output devices in any combination. Such input-output devices are used to support one or more user interfaces to the temporal prediction system 105, as well as to support communication between the temporal prediction system 105 and other related systems and devices not explicitly shown.

The temporal prediction system 105 in the FIG. 1 embodiment is assumed to be implemented using at least one processing device. Each such processing device generally comprises at least one processor and an associated memory, and implements one or more functional modules for controlling certain features of the temporal prediction system 105.

More particularly, the temporal prediction system 105 in this embodiment comprises a processor 120 coupled to a memory 122 and a network interface 124. The processor 120 illustratively comprises a microprocessor, a microcontroller, an application-specific integrated circuit (ASIC), a field-programmable gate array (FPGA) or other type of processing circuitry, as well as portions or combinations of such circuitry elements. The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

As further detailed herein, articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the temporal prediction system 105 to communicate over the network 104 with the user devices 102, and illustratively comprises one or more conventional transceivers.

The processor 120 further comprises a KG subset determination component 130, a relevant snapshot predictor 132, a validity window quantifier 134, and a prediction value validity window calculator 136. It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134, and 136 in other embodiments can be combined into a single module, or separated across a larger number of modules. As another example, multiple distinct processors can be used to implement different ones of the modules 130, 132, 134, and 136 or portions thereof.

At least portions of the KG subset determination component 130, relevant snapshot predictor 132, validity window quantifier 134, and prediction value validity window calculator 136 may be implemented at least in part in the form of software that is stored in memory 122 and executed by processor 120.

It is to be understood that the particular set of elements shown in FIG. 1 is presented by way of illustrative example only, and in other embodiments additional or alternative elements may be used. Thus, another embodiment may include additional or alternative systems, devices and other network entities, as well as different arrangements of modules and other components. By way of example, in other embodiments, the temporal prediction system 105 can be eliminated and associated elements such as KG subset determination component 130, relevant snapshot predictor 132, validity window quantifier 134, and prediction value validity window calculator 136 can be implemented elsewhere in the computer network 100.

An exemplary process utilizing KG subset determination component 130, relevant snapshot predictor 132, validity window quantifier 134, and prediction value validity window calculator 136 of the temporal prediction system 105 in computer network 100 will be described in more detail below.

By way of example, in connection with a particular prediction, the KG subset determination component 130 can identify subsets (of nodes and relationships) of knowledge graph portions that correspond to correctly-predicted training examples. The relevant snapshot predictor 132 can subsequently determine, for each subset, relevant historic snapshots and relevant predicted future snapshots of each identified subset. For example, via an improved time series analysis, both past and future snapshots can be utilized to predict a validity window. Further, one or more embodiments of the invention include determining, for each example (that is, for each prediction), the important past and future snapshots (among multiple snapshots). Such an embodiment can additionally include finalizing a prediction based only on the relevant snapshots.

Additionally, the validity window quantifier 134 can quantify a validity window for each of the correctly predicted training examples via, for example, employing a time series analysis and/or statistical analysis. During a training phase, one or more embodiments of the invention can include using the validity windows of labeled data (if available) to learn which snapshots of the KG (historic and future) are relevant in order to quantify the size of the validity window corresponding to the particular prediction in question.

Further, the prediction value validity window calculator 136 can generate and/or calculate a validity window for the particular prediction using the quantified validity windows for the correctly predicted training examples. Additionally, at least one embodiment of the invention can include, via one or more machine learning algorithms, re-computing the feature space for testing data given each identified snapshot. Subsequently, given a set of predictions over a set of relevant snapshots, such an embodiment (utilizing component 134, for example) can include employing time series and statistical analyses to quantify the validity window for each snapshot.

Also, in one or more embodiments of the invention, for each relevant snapshot (whether historic or future), an updated set of features can be extracted to re-compute and/or re-train a model in order to predict and/or classify the labeled training examples. Further, the updated feature space can be used to identify the features that can facilitate predicting the relevant snapshots and, subsequently, the time/validity window. By way merely of illustration, consider a scenario wherein one feature space exists for a prediction and one feature space exists for predicting the validity window. These two feature spaces can be overlapping or disjoint, and they can be learned together or separately. One or more embodiments of the invention can include, for example, learning the second feature space (for the validity window) based on the relevant past and future snapshots as well as through a time series analysis. Also, any significant changes (determined by a validity window) of a training example prediction can then be used to learn the temporally-important snapshot for each additional training example in order to determine the temporal validity window.

Further, at least one embodiment of the invention can include re-computing the prediction values for each relevant snapshot using the updated feature space in order to extend the prediction to an array of relevant snapshots. By way of illustration, it is noted that each snapshot is a copy of the KG at a given point in time. For each identified relevant snapshot, an example embodiment of the invention can include running an original prediction model to predict a value. As a result, an array of predictions (one for each prediction) is generated. Accordingly, such an embodiment can subsequently include running a time series analysis to determine the validity window for each such prediction. For example, a result of such an analysis might indicate that the prediction fluctuates every five hours, or every three days, etc.

Figure 2:
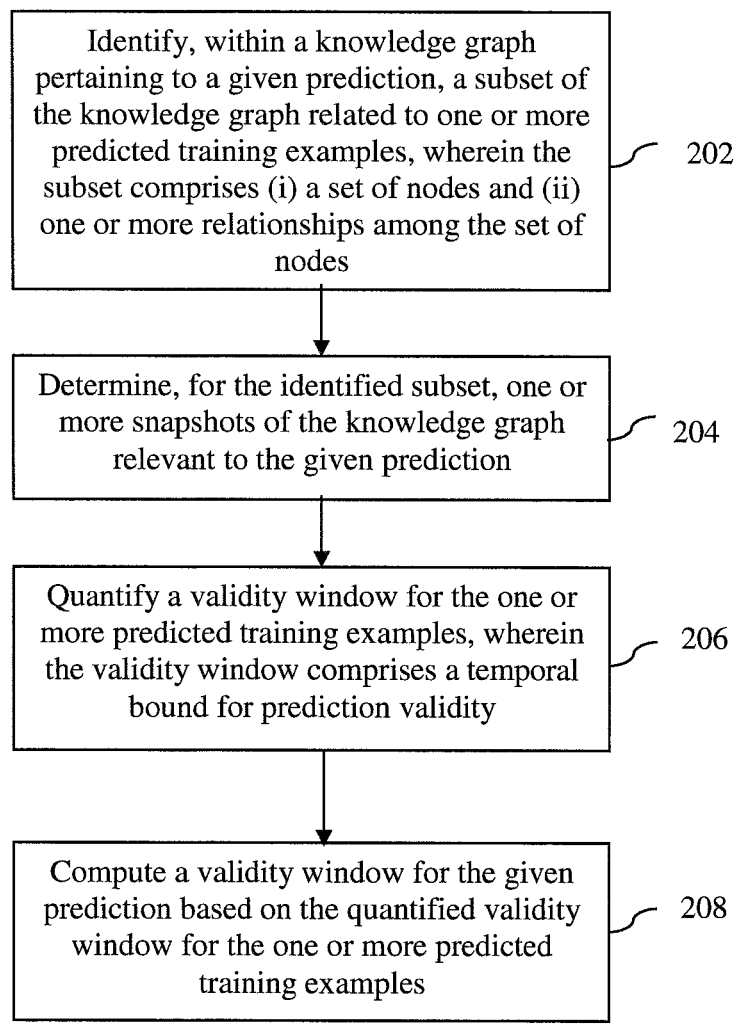
FIG. 2 is a flow diagram illustrating techniques according to an embodiment of the invention.

FIG. 2 is a flow diagram illustrating techniques according to an embodiment of the present invention. Step 202 includes identifying, within a knowledge graph pertaining to a given prediction, a subset of the knowledge graph related to one or more predicted training examples, wherein the subset comprises (i) a set of nodes and (ii) one or more relationships among the set of nodes. The given prediction can include a predicted value of a particular asset embodied within the knowledge graph.

Step 204 includes determining, for the identified subset, one or more snapshots of the knowledge graph relevant to the given prediction. The snapshots of the knowledge graph relevant to the given prediction can include one or more historic snapshots and one or more predicted future snapshots. In at least one embodiment of the invention, the one or more historic snapshots can include multiple historic snapshots differentiated based on a learned threshold, and the one or more predicted future snapshots can include multiple predicted future snapshots differentiated based on a learned threshold.

Determining the one or more historic snapshots can include employing a version of the knowledge graph that is enhanced with historic information for each entity in the knowledge graph and each relation among the entities in the knowledge graph. Also, at least one embodiment of the invention can include predicting the one or more future snapshots using at least one link discovery technique (such as matrix completion, for example) given the current state of the knowledge graph. By way of example, if the data at issue include a KG, one or more embodiments of the invention include predicting what nodes and/or edges will be added to the graph, going from one snapshot to the next.

Step 206 includes quantifying a validity window for the one or more predicted training examples, wherein the validity window comprises a temporal bound for prediction validity. Quantifying the validity window for the one or more predicted training examples can include employing a time series analysis to the one or more snapshots of the knowledge graph. Step 208 includes computing a validity window for the given prediction based on the quantified validity window for the one or more predicted training examples.

The techniques depicted in FIG. 2 can also include extracting one or more features from the snapshots of the knowledge graph. Additionally, one or more embodiments of the invention can include training a prediction model based on the one or more extracted features, and updating the given prediction based on utilization of the prediction model. Also, in at least one embodiment of the invention incorporating the techniques depicted in FIG. 2, software is provided as a service in a cloud environment.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives KG and prediction information sent from a data source to the transmission server. The server can process the information, for example, based upon user-provided user preference information that is stored in memory on the server. Subsequently, an alert is generated containing a temporal validity window for a prediction. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a uniform resource locator (URL) associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
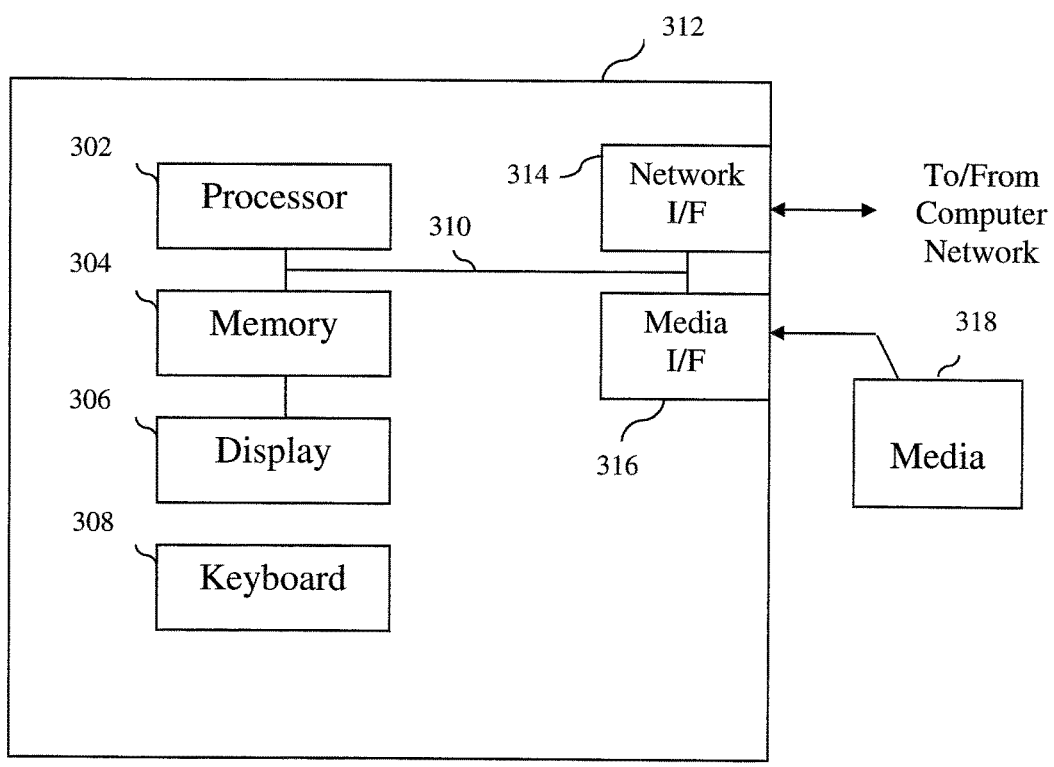
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM, ROM, a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network or a wide area network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
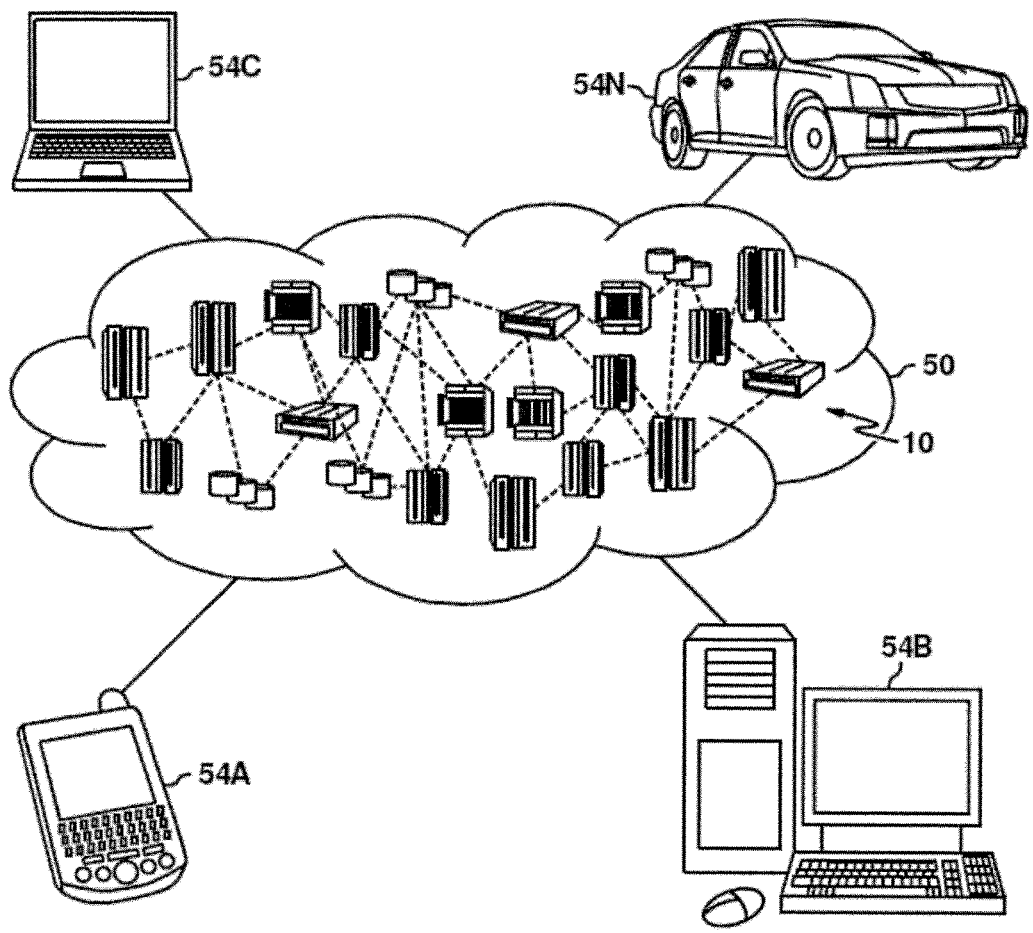
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
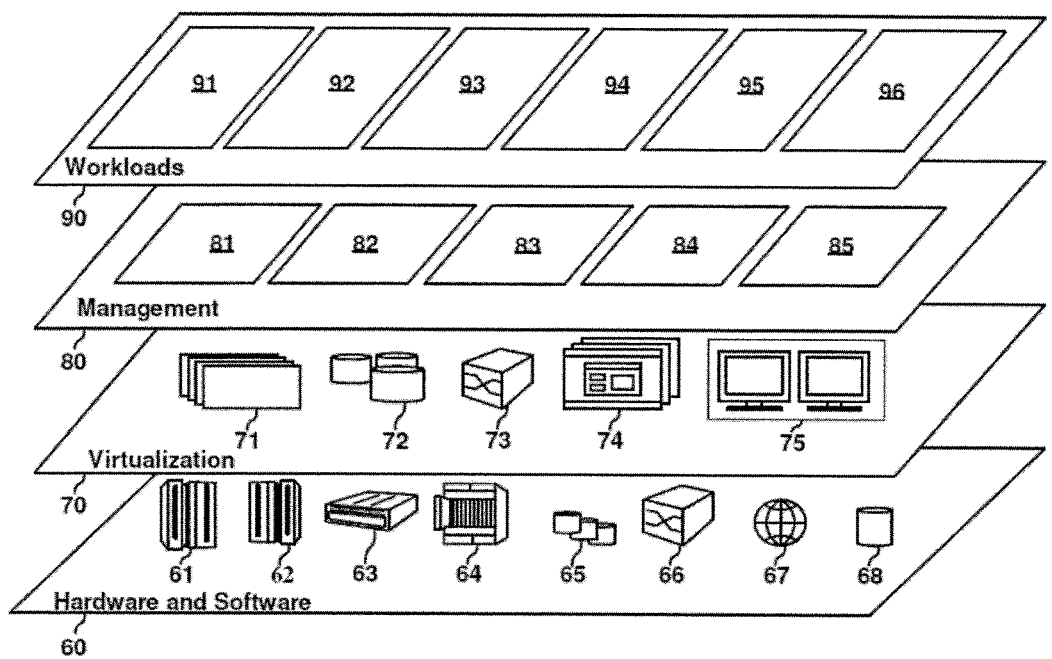
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a prediction value validity window calculation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, employing a KG that is enhanced with historic information during training and testing to determine the validity window of a prediction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, within a knowledge graph pertaining to a given prediction of a value of a variable, a subset of the knowledge graph related to one or more predicted training examples, wherein the subset comprises (i) a set of nodes and (ii) one or more relationships among the set of nodes;
   determining, for the identified subset, a plurality of snapshots of the knowledge graph relevant to the given prediction, wherein each of the plurality of snapshots comprises a static copy of the knowledge graph at a given point in time, wherein the plurality of snapshots of the knowledge graph comprise (i) one or more historical snapshots corresponding to historical data and (ii) one or more predicted future snapshots, and wherein said determining comprises: (i) employing a version of the knowledge graph that is enhanced with historic information for each entity in the knowledge graph and each relation among the entities in the knowledge graph and (ii) predicting the one or more future snapshots using at least one link discovery technique given the current state of the knowledge graph, wherein the at least one link discovery technique comprises matrix completion;
   quantifying a validity window for the one or more predicted training examples, wherein the validity window comprises a temporal bound for prediction validity, wherein said quantifying the validity window for the one or more predicted training examples comprises employing a time series analysis to the determined plurality of snapshots of the knowledge graph;
   computing a validity window for the given prediction based on the quantified validity window for the one or more predicted training examples;
   extracting one or more features from the plurality of snapshots of the knowledge graph;
   training a prediction model based on the one or more extracted features; and
   updating the given prediction based on utilization of the prediction model.

2. The computer-implemented method of claim 1, wherein the one or more historic snapshots comprise multiple historic snapshots differentiated based on a learned threshold.

3. The computer-implemented method of claim 1, wherein the one or more predicted future snapshots comprise multiple predicted future snapshots differentiated based on a learned threshold.

4. The computer-implemented method of claim 1, wherein the given prediction comprises a predicted value of a particular asset embodied within the knowledge graph.

5. The method of claim 1, comprising:
   generating a prediction for each of the identified plurality of snapshots.

6. A computer program product comprising a non-transitory computer readable storage medium having program instructions embodied therewith, the program instructions executable by a computing device to cause the computing device to:
   identify, within a knowledge graph pertaining to a given prediction of a value of a variable, a subset of the knowledge graph related to one or more predicted training examples, wherein the subset comprises (i) a set of nodes and (ii) one or more relationships among the set of nodes;
   determine, for the identified subset, a plurality of snapshots of the knowledge graph relevant to the given prediction, wherein each of the plurality of snapshots comprises a static copy of the knowledge graph at a given point in time, wherein the plurality of snapshots of the knowledge graph comprise (i) one or more historical snapshots corresponding to historical data and (ii) one or more predicted future snapshots, and wherein said determining comprises: (i) employing a version of the knowledge graph that is enhanced with historic information for each entity in the knowledge graph and each relation among the entities in the knowledge graph and (ii) predicting the one or more future snapshots using at least one link discovery technique given the current state of the knowledge graph, wherein the at least one link discovery technique comprises matrix completion;
   quantify a validity window for the one or more predicted training examples, wherein the validity window comprises a temporal bound for prediction validity, wherein said quantifying the validity window for the one or more predicted training examples comprises employing a time series analysis to the determined plurality of snapshots of the knowledge graph;

compute a validity window for the given prediction based on the quantified validity window for the one or more predicted training examples;

extract one or more features from the plurality of snapshots of the knowledge graph;

train a prediction model based on the one or more extracted features; and update the given prediction based on utilization of the prediction model.

7. The computer program product of claim 6, wherein the given prediction comprises a predicted value of a particular asset embodied within the knowledge graph.

8. The computer program product of claim 6, wherein the one or more historic snapshots comprise multiple historic snapshots differentiated based on a learned threshold.

9. The computer program product of claim 6, wherein the one or more predicted future snapshots comprise multiple predicted future snapshots differentiated based on a learned threshold.

10. The computer program product of claim 6, wherein the program instructions executable by the computing device further cause the computing device to:

generating a prediction for each of the identified plurality of snapshots.

11. A system comprising:

at least one processors; and at least one non-transitory memory including computer program instructions, the at least one memory and the computer program instructions configured to, with the at least one processor, cause the system at least to perform:

identifying, within a knowledge graph pertaining to a given prediction of a value of a variable, a subset of the knowledge graph related to one or more predicted training examples, wherein the subset comprises (i) a set of nodes and (ii) one or more relationships among the set of nodes;

determining, for the identified subset, a plurality of snapshots of the knowledge graph relevant to the given prediction, wherein each of the plurality of snapshots comprises a static copy of the knowledge graph at a given point in time, wherein the plurality of snapshots of the knowledge graph comprise (i) one or more historical snapshots corresponding to historical data and (ii) one or more predicted future snapshots, and wherein said determining comprises: (i) employing a version of the knowledge graph that is enhanced with historic information for each entity in the knowledge graph and each relation among the entities in the knowledge graph and (ii) predicting the one or more future snapshots using at least one link discovery technique given the current state of the knowledge graph, wherein the at least one link discovery technique comprises matrix completion;

quantifying a validity window for the one or more predicted training examples, wherein the validity window comprises a temporal bound for prediction validity, wherein said quantifying the validity window for the one or more predicted training examples comprises employing a time series analysis to the determined plurality of snapshots of the knowledge graph;

computing a validity window for the given prediction based on the quantified validity window for the one or more predicted training examples;

extracting one or more features from the plurality of snapshots of the knowledge graph;

training a prediction model based on the one or more extracted features; and updating the given prediction based on utilization of the prediction model.

12. The system of claim 11, wherein the one or more historic snapshots comprise multiple historic snapshots differentiated based on a learned threshold.

13. The system of claim 11, wherein the one or more predicted future snapshots comprise multiple predicted future snapshots differentiated based on a learned threshold.

14. The system of claim 11, wherein the given prediction comprises a predicted value of a particular asset embodied within the knowledge graph.

15. The system of claim 11, wherein the at least one memory and the computer program instructions are configured to, with the at least one processor, cause the system to perform:

generating a prediction for each of the identified plurality of snapshots.

* * * * *